US012564988B2

(12) United States Patent
Hausmann et al.

(10) Patent No.: US 12,564,988 B2
(45) Date of Patent: Mar. 3, 2026

(54) METHOD OF PRODUCTION FOR COMPONENTS OF A FUEL CELL STACK

(71) Applicant: CELLCENTRIC GMBH & CO. KG, Kirchheim/Teck-Nabern (DE)

(72) Inventors: Philipp Hausmann, Kirchheim unter Teck (DE); Hubertus Rehermann, Deizisau (DE)

(73) Assignee: CELLCENTRIC GMBH & CO. KG, Kirchheim Unter Teck (DE)

( * ) Notice: Subject to any disclaimer, the term of this patent is extended or adjusted under 35 U.S.C. 154(b) by 89 days.

(21) Appl. No.: 18/252,563

(22) PCT Filed: Nov. 11, 2021

(86) PCT No.: PCT/EP2021/081403
§ 371 (c)(1),
(2) Date: May 11, 2023

(87) PCT Pub. No.: WO2022/101351
PCT Pub. Date: May 19, 2022

(65) Prior Publication Data
US 2024/0017449 A1 Jan. 18, 2024

(30) Foreign Application Priority Data
Nov. 12, 2020 (DE) ..................... 10 2020 006 943.6

(51) Int. Cl.
*B29C 43/48* (2006.01)
*B29C 43/22* (2006.01)
(Continued)

(52) U.S. Cl.
CPC ............ *B29C 43/48* (2013.01); *B29C 43/222* (2013.01); *B29C 43/28* (2013.01); *B29C 43/52* (2013.01);
(Continued)

(58) Field of Classification Search
CPC ......... B29C 43/48; B29C 43/28; B29C 43/22; B29C 43/52; H01M 8/0213;
(Continued)

(56) References Cited

U.S. PATENT DOCUMENTS 6,823,584 B2* 11/2004 Schaefer ............. H01M 8/1004
29/853
2003/0102591 A1 6/2003 Thielman et al.
(Continued)

FOREIGN PATENT DOCUMENTS

EP 0949704 10/1999
EP 1954464 8/2008
(Continued)

OTHER PUBLICATIONS

Zoltek PX35 data sheet for carbon fiber (Year: 2025).*
(Continued)

*Primary Examiner* — John J DeRusso
*Assistant Examiner* — Shibin Liang
(74) *Attorney, Agent, or Firm* — Sheridan Ross P.C.

(57) ABSTRACT

The invention relates to manufacturing method for components of a fuel cell stack from a mixture of plastic and at least one electrically conductive filler by means of a double belt press. The manufacturing method according to the invention is characterized in that an uncured or incompletely cured strip-shaped blank comprising the mixture is fed into an isochoric double belt press having individual segments, wherein each of the individual segments has a shaping structure for shaping the blank into the component as the blank passes through the double belt press, wherein the individual segments on the two belts of the double belt press position themselves relative to one another during the pressing process by means of corresponding locking elements. The invention further relates to a manufacturing method for (Continued)

Figures 4, 5, 6:
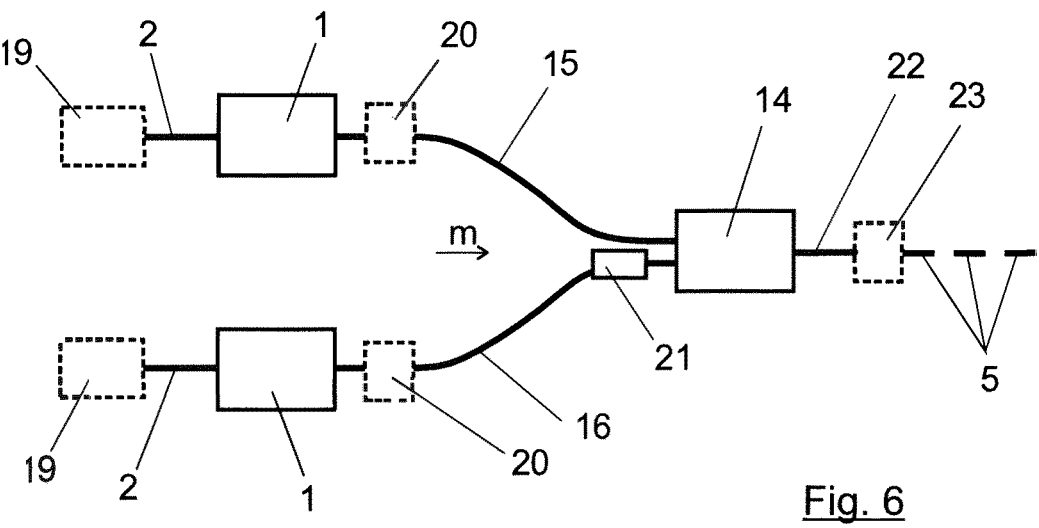

bipolar plates and/or interface plates, the halves of which are manufactured according to the above method and are bonded to one another in an isobaric double belt press.

13 Claims, 2 Drawing Sheets

(51) Int. Cl.

| | |
|---|---|
| *B29C 43/28* | (2006.01) |
| *B29C 43/52* | (2006.01) |
| *H01M 8/0213* | (2016.01) |
| *H01M 8/0221* | (2016.01) |
| *H01M 8/0226* | (2016.01) |
| *B29K 507/04* | (2006.01) |
| *B29L 31/34* | (2006.01) |
| *H01M 4/02* | (2006.01) |

(52) U.S. Cl.
CPC ....... *H01M 8/0213* (2013.01); *H01M 8/0221* (2013.01); *H01M 8/0226* (2013.01); *B29C 2043/483* (2013.01); *B29K 2507/04* (2013.01); *B29K 2995/0005* (2013.01); *B29L 2031/3468* (2013.01); *H01M 2004/029* (2013.01)

(58) Field of Classification Search
CPC ............. H01M 8/0226; H01M 8/0221; H01M 2004/029; H01M 8/00; H01R 43/00
See application file for complete search history.

(56) References Cited

U.S. PATENT DOCUMENTS

| | | | |
|---|---|---|---|
| 2009/0302500 A1* | 12/2009 | Haynes | ................... B29C 43/06 |
| | | | 264/319 |
| 2010/0307681 A1 | 12/2010 | Breault et al. | |
| 2014/0338825 A1* | 11/2014 | Breault | ............... H01M 8/0226 |
| | | | 156/244.18 |
| 2018/0111302 A1* | 4/2018 | Kondogiani | ............ B29C 55/22 |

FOREIGN PATENT DOCUMENTS

| | | |
|---|---|---|
| EP | 2801121 | 5/2017 |
| JP | 2012-227012 | 11/2012 |
| WO | WO 01/60593 | 8/2001 |
| WO | WO 2007/058549 | 5/2007 |

OTHER PUBLICATIONS

International Search Report and Written Opinion for International (PCT) Patent Application No. PCT/EP2021/081403, dated Feb. 21, 2022, 12 pages.
English Translation of the International (PCT) Patent Application No. PCT/EP2021/081403, dated Feb. 21, 2022, 2 pages.
English Translation of the International Search Report for International (PCT) Patent Application No. PCT/EP2021/081403, dated Feb. 21, 2022, 2 pages.
English Translation of the International Preliminary Report on Patentability for International (PCT) Patent Application No. PCT/EP2021/081403, dated May 16, 2023, 7 pages.

* cited by examiner

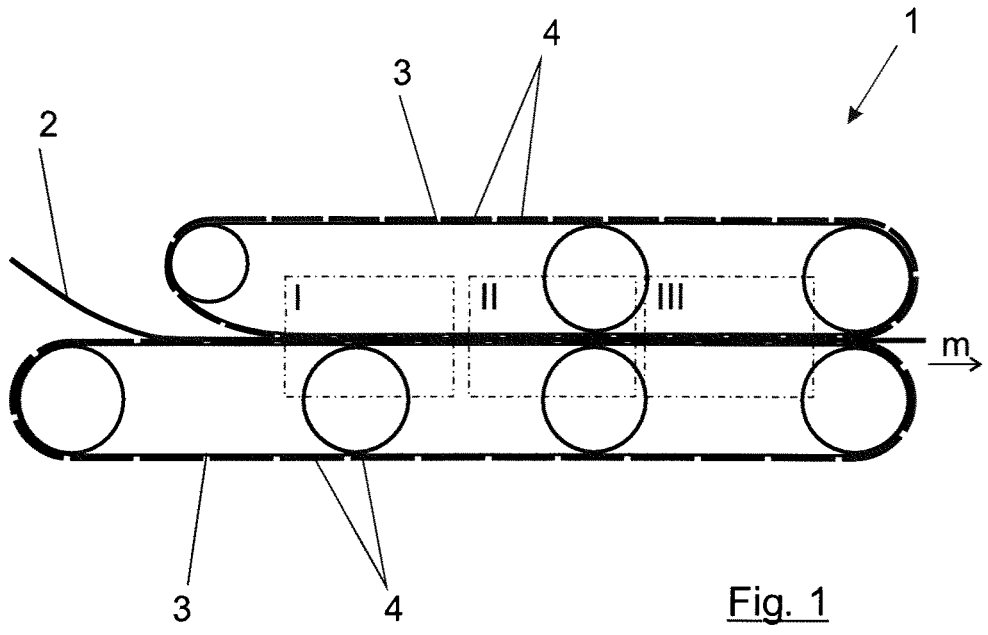
<u>Fig. 1</u>
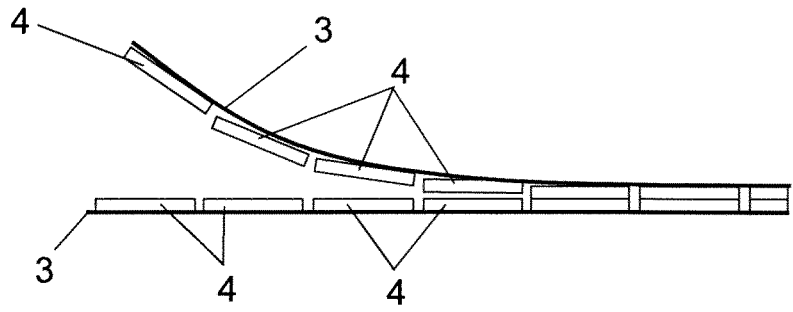
<u>Fig. 2</u>
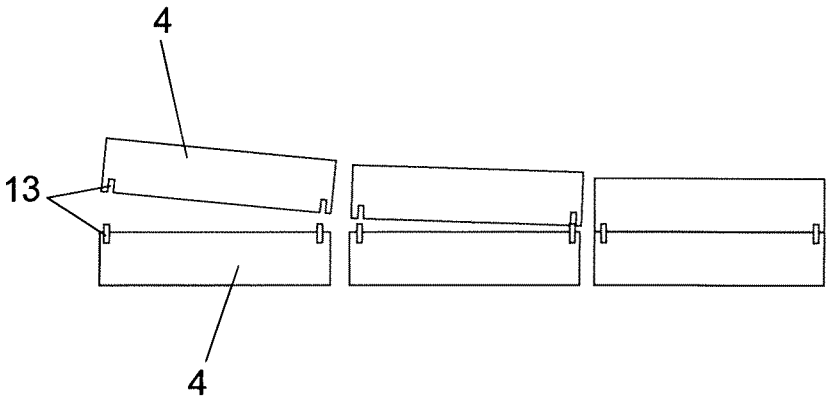
<u>Fig. 3</u>

METHOD OF PRODUCTION FOR COMPONENTS OF A FUEL CELL STACK

CROSS REFERENCE TO RELATED APPLICATIONS

This application is a national stage application under 35 U.S.C. 371 and claims the benefit of PCT Application No. PCT/EP2021/081403 having an international filing date of 11 Nov. 2021, which designated the United States, and which PCT application claimed the benefit of German Patent Application No. 10 2020 006 943.6 filed 12 November, the contents of each of which are incorporated herein by reference in their entireties.

The invention relates to a manufacturing method for components of a fuel cell stack of a type further defined in the preamble of claim 1. In addition, the invention relates to a manufacturing method for bipolar plates for a fuel cell stack.

The manufacturing of components for fuel cell stacks, in particular bipolar plates or parts of bipolar plates for a fuel cell stack from a mixture of plastic and at least one electrically conductive filler, is known to this end from prior art. Typically, appropriate presses are used hereto, in which duromers provided with electrically conductive fillers are hot-pressed for 30 to 90 seconds in a relatively lengthy process by hot-pressing. Alternatively, cold presses may also be used to manufacture such components based on thermoplastics. This has the disadvantage of a significantly lower strength. Other methods, as for example rotary embossing of sheet mold compounds, are basically also feasible, but this requires relatively high wall thicknesses, which finally result in a low energy density in the fuel cell stack manufactured in this way, and which are very limited in terms of geometric shaping. Alternatively, other plastics such as lacquers or the like may be used. These are then often arranged on carrier films made of another plastic material.

In addition, it is known from the prior art in the form of WO 01/60593 A2 to manufacture electrically conductive composite material as a blank using a so-called double belt press. However, due to low pressures and the fact that the belts are difficult to synchronize, the system is not suitable to manufacture components.

For further prior art, reference may also be made to EP 2 801 121 B1. There, a method for manufacturing a flow field plate from graphite and resin is described, in which such a mixture is melted. For this purpose, the mixture is extruded accordingly and inserted in a mold having a plurality of flow fields, which are then divided into individual plates. Here, the mold is a shaping tool for creating the desired structures of the flow fields in a bipolar plate provided with them for a fuel cell stack. Melting the material and then curing it in a mold is also relatively complicated and time-consuming. In addition, during curing in the mold, undesirable shape deviations may hardly be avoided due to shrinkage processes of the material being introduced as a liquid, which makes relatively large material thicknesses necessary, in particular in the stacking direction, to ensure the functionality of the flow field.

The objective of the present invention is here to provide a manufacturing method for components and/or bipolar plates of a fuel cell stack from a mixture of at least one plastic and at least one electrically conductive filler that is as energy- and time-efficient as possible.

According to the invention, said objective is solved by a manufacturing method for components of a fuel cell stack according to claim 1. Advantageous embodiments and further developments of this variant of the manufacturing method result from the subclaims dependent thereon. The objective is further solved by a manufacturing method for bipolar plates according to claim 8. Here, a particularly favorable and advantageous further development also follows from the subclaim dependent thereon. Favorable embodiments and further developments which may be used for both manufacturing methods are specified in the further dependent subclaims 10 to 12 for both manufacturing methods.

The manufacturing method for components of a fuel cell stack according to the invention uses a double belt press similar to the method in the above-mentioned prior art. Instead of merely manufacturing a strip-shaped blank as there, in the manufacturing method according to the invention an uncured or not yet completely cured strip-shaped blank from the mixture is fed to an isochoric double belt press having individual segments. Each of the individual segments of this special type of double belt press has a shaping structure for shaping the blank as it passes through the double belt press. The individual segments on the two belts of the double belt press thereby interlock during the pressing process by means of corresponding locking elements and are thus positioned reliably and repeatably relative to one another during the pressing process.

Thus, the manufacturing method allows to map the shaping structures in the blank during the pressing process in a precise position, in a dedicated double belt press having individual segments, which interlock with each other during the pressing process. This is a continuous process that does not require a complex handling of fragile components that are not yet (completely) cured. Rather, these components are generated in the corresponding isochoric double belt presses until they are finally cured. This allows a continuous manufacturing process which can provide high quantities of components in short time. Thus, process times of significantly under 0.5 seconds per component become possible. The components can be provided with a structure introduced by the individual segments both on one side or—preferably—on both sides.

Thus, according to an advantageous further development of the manufacturing method according to the invention, this in particular allows to manufacture anode-side and cathode-side halves of bipolar plates and/or interface plates for a fuel cell stack. The required structure of the flow fields as well as connection openings and distribution structures may be created by using the manufacturing process according to the invention in an efficient and geometrically accurate way.

According to an advantageous further development of the manufacturing method according to the invention, the individual segments may be replaceably mounted in the double belt press in order to be able to react to different requirements or geometrical modifications of the components, in particular the halves of bipolar plates, in a simple and rapid way.

Thus, according to a further very advantageous embodiment, at least one of the individual segments may comprise a shaping structure that differs from the shaping structure of the other individual segments. Preferably, the double belt press having the individual segments may be dimensioned relatively large. Thus, for example, such a double belt press may be used to manufacture the cathode-side halves of the bipolar plates and another adjacent double belt press may be used to manufacture the anode-side halves of the bipolar plates. In case a fuel cell stack or stack, respectively, made of said bipolar plates is formed with a total number of 250 to 300 individual cells, for example, a corresponding number of individual segments may thus manufacture all the required halves of bipolar plates in a single pass or circulation of the belts. In case one of the individual segments is designed thus that it forms a half-shell for an interface plate instead of a half-shell for a bipolar plate, that is, the plate closing off the fuel cell stack in each case, then a set of bipolar plates and interface plates for an entire fuel cell stack may be manufactured in a single circulation of two such double belt presses in a simple and efficient way. This way, no subsequent sorting and/or rearrangement of the halves is required. For the sake of simplicity, in the text often only bipolar plates are mentioned, but this shall also include the respective interface plates, where it is appropriate.

An especially preferred embodiment of the manufacturing method thus provides that the individual segments of at least one of the belts of the isochoric double belt press are rotatably fixed on a circulating belt. This rotational mobility of the individual segments of at least one belt enables them to rotate to a certain degree independently of the alignment of the belt in the respective area in such a way that an engagement of the corresponding locking elements of two individual segments which meet each another is facilitated.

According to a very advantageous development thereof, due to the gravity, they may align with the individual segments of the other belt in the inlet portion of the press. They may thus be accommodated accordingly by means of a rotationally movable fixture so that they may be aligned horizontally by gravity and cooperate with the individual segments being aligned respectively on the other belt or being fixed there respectively in a reliable way and at the accurate position. By such a horizontal meeting of the individual segments, a high degree of shaping accuracy is achieved during pressing of the components, which are in particular structured on both sides.

The preferred manufacturing process for bipolar plates according to the invention then provides that cathode-side and anode-side halves for the bipolar plates are respectively manufactured by means of two or more isochoric double belt presses having individual segments, in particular according to one of the above-mentioned variants of the embodiments. Subsequently, these halves are then bonded to one another in a conventional isobaric double belt press in a still continuous process. Here too, no separate handling of the elements is necessary. Rather, they may be fed in directly from the two isochoric double belt presses to the one isobaric double belt press and without rearranging or intermediate storage, and bonded together in the desired manner.

The adhesive before reaching the isobaric double belt press, is preferably applied accordingly using gravity, by means of a screen printing process or the like, for example, to the halves of the bipolar plates fed from below in the direction of gravity when used as intended, so that the bipolar plates are reliably bonded together in the subsequent isobaric double belt press. This enables a simple manufacturing of the complete bipolar plates in a continuous, very reliable and exceptionally fast process.

In case the belts are appropriately structured, further elements may be applied to the side of the belts facing away from the pressing process, for example gaskets, which are used for subsequent sealing of the individual cells and to ensure a sealing effect between the respective bipolar plate and the so-called membrane electrode assembly (MEA) adjacent to it or preferably a framed membrane electrode assembly (MEFA). The sealing material may be respectively integrated in the etched structures of the belts and applied to the bipolar plates in the isobaric double belt press, so that they are not only bonded together by their halves, but are simultaneously also firmly connected to the required gasket on at least one or preferably both of the outward-facing sides thereof.

In both variants of the double belt presses used in the two manufacturing methods described above, that is, both in the isobaric double belt press for bonding the halves and also in the isochoric double belt press for manufacturing the components or preferably the halves, different temperatures zones may be provided in the region of the respective double belt press in the direction of the material flow. This way, different requirements for the processes performed in each case during manufacturing may be combined within the double belt presses in a simple and efficient way. In particular, three zones having decreasing temperatures in the direction of material flow may be provided. In the region of the isobaric double belt press, these zones enable bonding, subsequent alignment and cooling of the bipolar plates in order to obtain planar bipolar plates from the two halves which have been bonded together, for example. In particular, in the region of isochoric double belt presses having individual segments, the temperature zones may include in particular a temperature zone for hot-pressing of the structures into the strip-shaped blank and a subsequent cooling, in particular three temperature zones may also be provided here, which provide hot, warm and cold temperatures in the material flow direction for hot-pressing and slow cooling of the halves.

A further very advantageous embodiment which may be applied to both of the manufacturing methods described above is that a station is provided for post-processing of the components or the bipolar plates downstream of at least one of the isochoric and/or isobaric double belt presses, wherein the post-processing includes in particular laser processing. By using such a laser processing, manufactured larger areas may be divided in individual elements, for example. In addition, corresponding structures and/or microstructures may be created on the surface to make certain areas of the bipolar plates hydrophilic or hydrophobic, depending on the design of the corresponding halves of the bipolar plates. In addition, structures may thus also be created which, in particular during the manufacturing of the halves of the bipolar plates, create structures which enable a better adhesion of the bipolar plates to each another during the final bonding of the halves to the bipolar plates or a better adhesion of gaskets which are subsequently applied to the bipolar plates. Further post-processings may also include cleaning using superheated steam, a plasma treatment or the like. In particular, a cutting or kinking of individual components along predetermined breaking points to separate the individual components and/or bipolar plates in the course of such a post-processing is also conceivable and possible in the continuous manufacturing method.

Further advantageous embodiments of the manufacturing processes according to the invention also result from the exemplary embodiments, which are described in more detail below with reference to the figures.

In a further embodiment of the method according to the invention the mating of prefabricated membrane electrode units is performed by means of the bipolar plates or interface plates which have been manufactured in the previous manufacturing process using a continuous double belt pressing process. Here, the one of the membrane electrode assembly and bonded and sealed bipolar plate or interface plate are continuously mated together using a DBP, wherein for an isochoric press a curing of previously applied adhesive is performed and for an isobaric press preferably an injection of sealing material into a shaping tool is performed.

HERE SHOWS

FIG. 1 an isochoric double belt press having individual segments in a schematic illustration;

FIG. 2 a schematic enlargement of a section of FIG. 1;

FIG. 3 a schematic enlargement of a section of FIG. 2;

FIG. 4 a schematic representation of a bipolar plate in a top view;

FIG. 5 an isobaric double belt press; and

FIG. 6 a schematically indicated process structure of a method for manufacturing bipolar plates.

In the illustration of FIG. 1, the double belt press is shown, which is designated in its entirety by 1. It is composed of a belt structure in the upper and a belt structure in the lower portion. A green body 2 as a strip-shaped blank, made of plastics and an electrically conductive filter, for example, is fed into the isochoric double belt press 1 and conveyed by the latter in a material flow direction designated by m through the double belt press. The double belt press 1 in the illustration of FIG. 1 is thus configured as a so-called isochoric double belt press 1. On the belts 3 thereof, it comprises a plurality of individual segments 4 which are only schematically indicated. Only some of them are marked with the reference sign 4.

Such a structure of a double belt press 1 having individual segments 4 now allows it to apply shaping structures into the individual segments 4 in order to map these structures into the green body and to manufacture the cathode-side or anode-side halves of a bipolar plate 5 or an interface plate, for example. Here, a bipolar plate 5 is the plate which is arranged between the individual cells of a fuel cell stack, wherein in the illustration of FIG. 4 an exemplary view of such a bipolar plate 5 is shown. An interface plate denotes the respective last plate of the cell stack, that is the plate to which no further adjacent single cell follows. Thus, on the one end of the fuel cell stack it constitutes an anode interface plate and on the other end it constitutes a cathode interface plate. In a fuel cell stack typically including 200 to 400 single cells, 200 to 400 bipolar plates 5 and one cathode-side and one anode-side interface plate are required, respectively. For the sake of simplicity, in the following only bipolar plates 5 are mentioned, but this shall also include the respective interface plates.

Such a bipolar plate 5 itself, as it is indicated in a top view in the illustration of FIG. 4, is typically made of two halves which are bonded together in the direction of the stack. In the illustration of FIG. 4, a top view of the bipolar plate 5 and here of the anode-side half is shown, for example. Using an opening designated by 6 in the bipolar plate 5, hydrogen or hydrogen-containing gas is fed in and by using the flow field designated by 7 it is uniformly distributed to a single cell or the membrane electrode arrangement which constitutes the core of the single cell. Residual gas is again discharged at the opening 8. At the opposite side of said half a respective flow field for a cooling medium is formed which flows in through the opening 9 and is discharged through the opening 10. The opposite half which is hidden here by the illustrated half, is designed in a similar and mirror-inverted way, so that air or oxygen flows via the opening 11 to said cathode-side half, is distributed in a flow field which is located on the backside of the illustration in FIG. 4, and the residual gases or exhaust gases, respectively, are discharged via the opening 12 again. Said structure of the bipolar plate 5 is generally known for a person skilled in fuel cells, thus a detailed description will be omitted here.

The individual segments 4 of the double belt press 1 according to FIG. 1, from which some are again shown in FIG. 2 in an enlarged illustration, now comprise corresponding structures in the region of their surfaces facing each other during the pressing process, for example, in order to form the flow field 7 on the upper side of the anode-side half of the bipolar plate shown in FIG. 4, and a corresponding flow field for a cooling medium on the rear side, and in particular also to create the openings or cutouts 6, 8, 9, 10, 11, 12, which form the continuous flow passages in the later fuel cell stack. In order to ensure an appropriate pressure during pressing and embossing of the structures, for example in a blank 2 made of graphite and duromer, and in addition to ensure the precision between the front side having the flow field 7 and the backside having a flow field for the cooling medium, by example of the anode-half, the individual segments 4 are suspended in a way, that they are positioned at the accurate position between the two belts 3 at least during pressing.

Hereto, the individual segments 4 are preferably rotatably suspended on belt 3, at least on belt 3 which is positioned on the upper side during manufacturing, such that they meet precisely with the individual segments 4 which are horizontally fed in at the lower belt 3, for example, during pressing. In order to ensure said fitting precision, locking elements 13 are provided, as is shown in the illustration of FIG. 3, which is to be understood as a further enlargement of the illustration of FIG. 2, which position the individual segments 4 in relation to each other in a precise fit, so as to ensure during pressing the lowest possible manufacturing tolerances between the one side and the other side of the manufactured halves of bipolar plates. The locking elements 13 may be implemented, for example, in the form of pins indicated here and—preferably funnel-shaped—openings, which engage with one another as the individual segments 4 move more and more closer to one another and thus reproducibly hold the individual segments 4 and the shaping structures introduced into the respective individual segments 4, which are not shown here, in the desired position relative to one another. By means of the structures the corresponding structure is then introduced into the material of the fed blank 2 using a kind of pressing and embossing, such that at the end of the double belt press 1 in the direction of the material flow m, the corresponding halves of the bipolar plates 5 are manufactured in a dimensionally stable way.

Hereto, the double belt press 1 preferably comprises three successive temperature zones in the direction of the material flow m, which are designated by I, II and III in the illustration of FIG. 1, and are drawn using a dashed line. A correspondingly high temperature prevails in the first temperature zone I, so that the mixture of the blank 2 is pressed and cured by a hot-pressing process in the isochoric double belt press 1 in order to determine the shape of the individual halves of the bipolar plates 5 using the individual segments 4. In the subsequent zone designated by II, a somewhat lower temperature prevails in order to gently cool down the material, while, as it remains between the individual segments 4 of the double belt press 1, it is ensured at the same time that the manufactured component does not warp during the cooling phase, but may be manufactured in a planar and geometrically accurate way. In the third temperature zone, designated by III, then the ambient temperature of the device prevails again, so that a further cooling takes place before the halves of the bipolar plates 5 thus manufactured exit the double belt press 1.

In contrast to previous processes, the manufacturing of the halves of the bipolar plates 5 in the double belt press according to FIG. 1 is thereby possible in a continuous mode, so that the bipolar plate halves for a fuel cell stack may be manufactured in each circulation of the belts 3, for example. The use of the individual segments 4, which may also be replaced, where appropriate, in order to rapidly adapt the system to design modifications, enables also, when the number of individual segments 4 corresponds to the number of individual cells, for example, to manufacture all the required halves, on the anode-side, for example, using a single circulation of the double belt press 1, whereby preferably one of the individual segments 4 implements the shaping for an interface plate, so that it may be manufactured directly at the same time without requiring a complex and parallel process hereto. As said interface plate is typically only required one time for every 200 to 300 halves, this would otherwise cause significant effort and would typically require a parallel but very low utilized manufacturing.

Another advantage of the design of the isochoric double belt presses 1 is that the individual segments 4, which return on the side facing away from the pressing process, that is on the upper belt 3 at the upper side and on the lower belt 3 at the lower side, are empty in this phase. They may be cleaned there, for example, or sprayed with a release agent, or even prepared with inserts to utmost leverage the return process and to improve and speed up the process in general.

The halves of the bipolar plate 5 manufactured in this way may then be joined to one another respectively using an isobaric double belt press 14, as indicated in the illustration of FIG. 5. The configuration is basically the same as for the double belt press 1, which is configured as an isochoric double belt press having individual segments 4.

Only the individual segments are omitted, such that the belts 3 of the isobaric double belt press 14 directly perform a pressing of the layers to one another, as it is generally known from the field of double belt presses. For example, a strip of anode-side halves is fed from above and is designated by 15, while a strip of cathode-side halves, designated by 16 is fed in from below. The sides of the anode-side and cathode-side halves of the strips 15, 16 which are facing each another are the portions, respectively, between which the cooling medium will later flow. Preferably on the lower strip 16, when viewed in the direction of gravity, an adhesive 17 is also applied in a predetermined structure, for example using screen printing or the like. The adhesive will typically enclose the outer edges of the respective half of the bipolar plate 5, as well as the corresponding openings 6, 8, 11, and 12, which are not in communication with a flow field for the cooling medium. Using said adhesive 17, the individual halves of the later bipolar plate 5 are thus bonded together. This is performed in the isobaric double belt press 14 in a process which is still executed continuously and is downstream to the manufacturing of the halves, which thus completes the manufacturing of the bipolar plates 5 in simple and efficient way and by leveraging low cycle times. Here, different temperature zones I, II and III are also possible, e.g., to activate and/or fluidize adhesives, to cure and/or to align the components and to cool them in a directed manner.

Here, the belts 3 are not in engagement with the materials to be pressed and bonded at the return path thereof, that is, at the top in the upper part of the double belt press 14 and at the bottom in the lower part of the double belt press 14. Here it is then possible to clean the belts correspondingly, apply release agents or the like.

Preferably, it may now be provided that the belts 3 each include a structure. Said structure may be realized in particular as an etched structure which is etched into the belts 3 by electrochemical or photochemical processes. The structure may, for example, have the form of gaskets which are required later on the bipolar plate 5, which seal the bipolar plate appropriately with respect to a framed membrane electrode assembly (MEFA). The sealing material may for example be applied in the stations indicated and each designated by the reference sign 18. Thus, in addition to bonding the two materials 15, 16 of the respective halves of the bipolar plates 5, a gasket may thus be applied on the corresponding surfaces of the bipolar plate 5 to seal them later with respect to both adjacent framed membrane electrode assemblies in a simple and efficient way. The applied sealing material then coalesces with the material of the individual bipolar plates 5 in the isobaric double belt press 14, where appropriate, due to the impact of temperature on one of the zones I, II or III, so that they are finally completely formed and only have to be divided into the individual plates.

In the illustration of FIG. 6, the complete manufacturing process is shown again. The core is formed by two isochoric double belt presses 1, to each of which a blank 2 is fed, which may be manufactured in further optionally used double belt presses or other suitable devices, which are here designated by 19. The blank 2 may, for example, be formed in the manner of a film of a strip-shaped green body made of not or not completely cured resin with electrically conductive fillers such as graphite, but basically also of other plastics such as gels, varnishes or the like, optionally with a film or the like as carrier.

Downstream of the respective isochoric double belt presses 1 having individual segments 4, two optional postprocessing stations designated by 20 are added, which may be used, for example, to create various structures using plasma processing, laser processing or the like, for example to improve the adhesion of the adhesive 17 applied later, but also to create hydrophobic or hydrophilic areas within the flow fields in a targeted way to cut out apertures and/or the like. The material now designated by 15 at the upper side and 16 at the lower side, analogous to the representation in FIG. 5, with the anode-side and cathode-side halves of the bipolar plate 5, respectively, reaches the isobaric double belt press 14 in the continuous manufacturing flow, wherein for one of the materials, here the material 16, the adhesive 17 is previously applied at the desired locations, for example by screen printing, in a station designated by 21. In the material flow direction m downstream of the isobaric double belt press 14, a material 22 comprising the entire bipolar plates 5, which may also already be provided with gaskets applied to the material of the bipolar plates 5, where appropriate, exits the double belt press 14. Said material 22 may then be divided into the individual bipolar plates 5 in a further optional post-processing station 23, as is schematically indicated in the illustration of FIG. 6 with the three bipolar plates 5.

By means of such a manufacturing method, as shown for example in the illustration of FIG. 6, a plurality of bipolar plates 5 including the appropriate number of interface plates, which will be preferably positioned at exactly the correct position within the separated bipolar plates 5 due to a respective arrangement of the individual segments 4, may be manufactured in a continuous process without materials having to be manually moved, temporarily stored or sorted within the manufacturing process. Thus, high manufacturing speeds with four or more bipolar plates 5 per second may easily be achieved, such that a very fast, efficient manufacturing of the bipolar plates 5 and interface plates which may be repeated with a high manufacturing accuracy becomes possible. They may then be packed into units corresponding to one fuel cell stack each immediately downstream of the post-processing station 23, without the need for further sorting, rearranging or the like. This ensures a very efficient, simple and cost-effective high-volume manufacturing process for the bipolar plates 5, for example from a graphite-filled duromer such as a phenolic resin, an epoxy resin or the like. In addition, the bipolar plates 5 also have a correspondingly high load-bearing capacity, without the previously common disadvantage of a very slow manufacturing of such mechanically advantageous bipolar plates 5.

The invention claimed is:

1. Manufacturing method for components of a fuel cell stack from a mixture, which at least comprises one plastic and at least one electrically conductive filler by means of a double belt press, wherein an uncured or incompletely cured strip-shaped blank from the mixture is fed into an isochoric double belt press having individual segments, wherein each of the individual segments has a shaping structure for shaping the blank into the component as the blank passes through the double belt press, wherein the individual segments on the two belts of the double belt press position themselves relative to one another by means of corresponding locking elements during the pressing process, which allows to map the shaping structures in the blank during the pressing process in a precise position, and at least one individual segment (4) is used, which comprises a shaping structure which differs from the shaping structures of the other individual segments.

2. Manufacturing method according to claim 1, wherein the mixture comprises at least one duromer and electrically conductive particulates.

3. Manufacturing method according to claim 2, wherein the individual segments are replaceable.

4. Manufacturing method according to claim 2, wherein the individual segments on at least one of the belts are rotatably fixed on said circulating belt.

5. Manufacturing method according to claim 2, wherein anode-side halves and cathode-side halves of bipolar plates and/or interface plates are manufactured as components.

6. Manufacturing method according to claim 1, wherein the individual segments are replaceable.

7. Manufacturing method according to claim 6, wherein the individual segments on at least one of the belts are rotatably fixed on said circulating belt.

8. Manufacturing method according to claim 1, wherein the individual segments on at least one of the belts are rotatably fixed on said circulating belt.

9. Manufacturing method according to claim 8, wherein the individual segments are fixed in such a way that they align themselves in the direction of gravity with respect to the individual segments of the other belt in the inlet portion of the double belt press.

10. Manufacturing method according to claim 1, wherein anode-side halves and cathode-side halves of bipolar plates and/or interface plates are manufactured as components.

11. Manufacturing method according to claim 1, wherein in the region of at least one of the double belt presses toward the flow of material, zones (I, II, II) are provided which have different temperatures.

12. Manufacturing method according to claim 11, characterized in that at least three zones (I, II, III) are provided having a temperature which is decreasing in the direction of material flow (m).

13. Manufacturing method according to claim 1, wherein the mating of prefabricated membrane electrode units is performed by means of bipolar plates or interface plates which have been manufactured in the previous manufacturing process by means of a continuous double belt pressing process.

* * * * *